US008820749B2

(12) United States Patent
Tones et al.

(10) Patent No.: US 8,820,749 B2
(45) Date of Patent: Sep. 2, 2014

(54) FLOODED BEARING ISOLATOR

(75) Inventors: Christopher E. Tones, Palmyra, NY (US); Gregory Burnett, Newark, NY (US); Kwongvoon Wong, Fairport, NY (US); Earl Rogalski, Walworth, NY (US)

(73) Assignee: Garlock Sealing Technologies, LLC, Palmyra, NY (US)

( * ) Notice: Subject to any disclaimer, the term of this patent is extended or adjusted under 35 U.S.C. 154(b) by 381 days.

(21) Appl. No.: 12/944,456

(22) Filed: Nov. 11, 2010

(65) Prior Publication Data

US 2011/0109047 A1    May 12, 2011

Related U.S. Application Data

(60) Provisional application No. 61/260,282, filed on Nov. 11, 2009, provisional application No. 61/350,371, filed on Jun. 1, 2010.

(51) Int. Cl.
*F16J 15/447* (2006.01)

(52) U.S. Cl.
USPC ............ 277/412; 277/418; 277/419; 277/411; 277/420; 277/549; 277/577

(58) Field of Classification Search
USPC .......... 277/411, 412, 418, 419, 420, 346, 347
See application file for complete search history.

(56) References Cited

U.S. PATENT DOCUMENTS

| | | |
|---|---|---|
| 2,014,859 A | 9/1935 | Mitchell |
| 3,192,942 A | 7/1965 | Manor et al. |
| 3,602,559 A | 8/1971 | Hischler |
| 3,923,125 A | 12/1975 | Rosenthal |
| 4,053,163 A | 10/1977 | Vegella |
| 4,070,150 A | 1/1978 | Katz et al. |
| 4,166,606 A | 9/1979 | Kawolics et al. |
| 4,466,620 A | 8/1984 | Orlowski |

(Continued)

FOREIGN PATENT DOCUMENTS

| | | |
|---|---|---|
| DE | 29715911 | 2/1999 |
| EP | 1962001 A1 | 8/2008 |

(Continued)

OTHER PUBLICATIONS

Written Opinion of the International Searching Authority re PCT/US2010/056364 with a mailing date of Jul. 26, 2011.

(Continued)

*Primary Examiner* — Kristina Fulton
*Assistant Examiner* — Eugene G Byrd
(74) *Attorney, Agent, or Firm* — Perkins Coie LLP (57) ABSTRACT

A labyrinth sealing device is disclosed for use between a rotating shaft and a bearing housing. In some embodiments, an internal stator engages the housing and a rotor engages the shaft. A labyrinth pathway is defined between the rotor and stator to prevent the migration of lubricants and/or contaminants in either direction. The rotor acts as a running surface for the sealing element, but may also with a ground surface of the rotor to provide a pump that continuously draws lubricant away from the sealing lip toward a sump. In another embodiment, the stator and sealing element are combined as a single element formed from a sealing material. A recess in the sealing lip creates a pressure differential at the sealing surface and minimizes wear.

16 Claims, 7 Drawing Sheets

(56) References Cited

U.S. PATENT DOCUMENTS

| | | | |
|---|---|---|---|
| 4,484,754 A | 11/1984 | Ballard | |
| 4,541,744 A | 9/1985 | Lederman | |
| 4,679,801 A | 7/1987 | Poloni | |
| 4,706,968 A | 11/1987 | Orlowski | |
| 4,743,034 A | 5/1988 | Kakabaker et al. | |
| 4,832,350 A | 5/1989 | Orlowski | |
| 4,852,890 A | 8/1989 | Borowski | |
| 4,863,177 A | 9/1989 | Rockwood et al. | |
| 4,890,941 A * | 1/1990 | Calafell et al. | 277/347 |
| 4,989,883 A | 2/1991 | Orlowski | |
| 5,024,451 A * | 6/1991 | Borowski | 277/412 |
| 5,069,461 A | 12/1991 | Orlowski | |
| 5,074,567 A | 12/1991 | Orlowski | |
| 5,078,410 A | 1/1992 | Warman | |
| 5,137,049 A | 8/1992 | Orlowski | |
| 5,158,304 A | 10/1992 | Orlowski | |
| 5,161,804 A | 11/1992 | Orlowski et al. | |
| 5,163,692 A | 11/1992 | Schofield et al. | |
| 5,174,583 A * | 12/1992 | Orlowski et al. | 277/421 |
| 5,221,095 A | 6/1993 | Orlowski | |
| 5,303,935 A | 4/1994 | Saksun | |
| 5,335,921 A | 8/1994 | Orlowski | |
| 5,378,000 A | 1/1995 | Orlowski | |
| 5,470,157 A | 11/1995 | Dougherty | |
| 5,480,161 A | 1/1996 | Borowski | |
| 5,498,006 A | 3/1996 | Orlowski | |
| 5,655,781 A | 8/1997 | Petrak | |
| 5,664,791 A | 9/1997 | Owen | |
| 5,683,091 A | 11/1997 | Isoe et al. | |
| 5,687,972 A | 11/1997 | Petrak | |
| 5,865,441 A | 2/1999 | Orlowski | |
| 5,887,875 A | 3/1999 | Salciccioli | |
| 5,904,356 A | 5/1999 | Mundy | |
| 5,908,195 A | 6/1999 | Sharrer | |
| 5,951,020 A | 9/1999 | Orlowski | |
| 5,951,033 A | 9/1999 | Winter et al. | |
| 5,961,124 A | 10/1999 | Muller | |
| 5,967,524 A | 10/1999 | Fedorovich | |
| 6,003,871 A * | 12/1999 | Poll | 277/309 |
| 6,015,153 A | 1/2000 | Sharrer | |
| 6,062,568 A | 5/2000 | Orlowski et al. | |
| 6,142,479 A | 11/2000 | Fedorovich | |
| 6,182,972 B1 | 2/2001 | Orlowski | |
| 6,213,476 B1 | 4/2001 | Chandler | |
| 6,234,489 B1 | 5/2001 | Orlowski et al. | |
| 6,257,587 B1 | 7/2001 | Toth | |
| 6,311,984 B1 | 11/2001 | Orlowski | |
| 6,367,807 B1 | 4/2002 | Rockwood | |
| 6,386,546 B1 * | 5/2002 | Fedorovich | 277/351 |
| 6,390,477 B1 | 5/2002 | Drago et al. | |
| 6,419,233 B2 | 7/2002 | Orlowski | |
| 6,450,503 B1 * | 9/2002 | Dossena et al. | 277/572 |
| 6,471,211 B1 | 10/2002 | Garnett | |
| 6,471,215 B1 | 10/2002 | Drago | |
| 6,485,022 B1 | 11/2002 | Fedorovich | |
| 7,201,377 B2 * | 4/2007 | Chitren et al. | 277/347 |
| 7,334,942 B2 * | 2/2008 | Cha et al. | 384/480 |
| 7,427,070 B2 * | 9/2008 | Chitren et al. | 277/347 |
| 7,604,239 B2 * | 10/2009 | Chitren et al. | 277/301 |
| 7,658,386 B2 * | 2/2010 | Oldenburg | 277/353 |
| 7,878,508 B2 * | 2/2011 | Nobrega | 277/352 |
| 2001/0002742 A1 | 6/2001 | Orlowski | |
| 2002/0167131 A1 | 11/2002 | Orlowski et al. | |
| 2003/0235354 A1 | 12/2003 | Orlowski et al. | |
| 2004/0070150 A1 | 4/2004 | Chitren | |
| 2006/0005950 A1 | 1/2006 | Wang et al. | |
| 2009/0127795 A1 * | 5/2009 | Lattime et al. | 277/412 |
| 2010/0201075 A1 * | 8/2010 | Roddis et al. | 277/402 |

FOREIGN PATENT DOCUMENTS

| | | | |
|---|---|---|---|
| GB | 1026714 | 4/1966 | |
| JP | 62228760 A | 10/1987 | |
| JP | 11108202 A * | 4/1999 | F16J 15/447 |
| WO | 9532376 | 11/1995 | |
| WO | 2006005950 | 1/2006 | |
| WO | 2008116884 A1 | 10/2008 | |

OTHER PUBLICATIONS

International Search Report mailed Feb. 11, 2001 for PCT/US2003/030625.

* cited by examiner

FLOODED BEARING ISOLATOR

This application claims priority to U.S. Provisional Patent Application No. 61/260,282, filed Nov. 11, 2009, and U.S. Provisional Patent Application No. 61/350,371, filed Jun. 1, 2010, both of which are hereby incorporated by reference in their entirety.

BACKGROUND

Labyrinth sealing devices are commonly used to provide a dynamic seal between a rotating shaft and a bearing housing. The sealing device excludes contaminates from the bearing housing while also preventing loss of bearing lubricants. In some applications, the lubrication level of the housing is above the lowest point of the seal. Commonly, the lubrication will eventually work through the seal and leak, where a non-contact seal is used. A contact type seal is desirable in such applications.

In a typical rotor and stator configuration, it is important to keep the rotor and stator from contacting one another. The rotor spins at very high speeds. If a surface of the rotor contacts a surface of the stator at these speeds, frictional heat develops, the parts wear and the overall efficiency of the apparatus declines. It is, therefore, important to keep the rotor and stator separate. The seal between the rotor and stator keeps them separate in the radial direction by providing a low friction contact between the two. It would be beneficial if the same seal could also prevent contact in the axial direction.

A further problem occurs when the housing is "flooded" with lubricant. A flooded housing refers to a bearing cavity with an excess of lubricant, thus "flooded". Traditional non-contacting seals do not function properly if used in a flooded housing.

Various seal devices have been previously developed to provide a dynamic seal between rotating shafts and a bearing housing. However, these previous designs have not resolved all of the operational issues experienced with these types of seals. For example, U.S. Pat. No. 6,234,489 to Orlowski et al. discloses a seal that includes a rotor and a stator. Enclosed within the rotor and stator is an insert that has an annular resilient member to hold one side of the insert in firm contact with an outer radial surface of the rotor. The shortcoming of this design is that, in its preferred configuration, the annular resilient member is provided as an o-ring.

Another seal design, disclosed within U.S. Pat. No. 6,386,546 to Fedorovich, includes a rotor and stator that are arranged to create a labyrinth portion and a contact portion. The stator includes one or more flanges biased toward the rotor surface to create the contact portion of the seal. The inherent problem with this type of seal is that the lay-down lip or flange biased toward the rotor cannot handle misalignment. Once the seal is misaligned, the lip gets flexed to one side of the seal and is then permanently deformed. Lubrication can then leak under the sealing lip if the misalignment is removed.

SUMMARY

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

A labyrinth sealing device is disclosed herein that, in many embodiments, is used between a rotating shaft and a bearing housing. In such embodiments, the design will include an internal stator that engages the housing and a rotor that engages the shaft. A labyrinth pathway is defined between the rotor and stator to prevent the migration of lubricants and/or contaminates in either direction. In some embodiments, the rotor acts as a running surface for the sealing element, but may also serve as a pump that continuously draws lubricant away from the sealing lip toward a sump.

In some embodiments, the stator mates with a sealing element, which also acts as a unitizing feature for the rotor and stator components. In such embodiments, a lip seal may serve as a standard lip seal with contact at the rotor. The sealing lip can be provided with a flat interface where it contacts the rotor. A portion of the sealing element interface will contact the smooth surface of the rotor while the remaining flat area of the sealing element will be suspended over a helical pumping feature on the rotor.

Various embodiments of the seal device are based on a uniquely shaped lip seal, which may be formed from PTFE, and a specifically placed pumping feature. The flat of the sealing element and the flat of the rotor will seal when static, but a helical pumping feature under the remaining portion of the seal flat will draw lubricant away from the seal lip.

In another embodiment, the stator and sealing element are provided as a single element, or sealing stator, which may be formed from a sealing material. A lip seal is provided to sealingly engage a running surface of the rotor. However, the sealing surface interface portion of the lip seal is provided with a recess that creates a pressure differential at the sealing surface interface portion. This limits the passage of fluid and debris while limiting wear. In such embodiments, the sealing stator includes a protrusion that extends from a radially outwardly positioned flange. The protrusion may be press fit past a mating nodule that extends outwardly from an outer edge of the rotor. Once the rotor and sealing stator are placed in a position where, the protrusion and mating nodule engage one another, one or more ridges or wear beads may be positioned along a lower surface of the sealing stator to engage the rotor, whereby minimal frictional engagement is attained between the rotor and the sealing stator.

In another embodiment, the sealing stator and rotor are positioned to form a labyrinth-type passage between the sealing stator and rotor that aids in preventing the migration of lubricants and/or contaminants in either direction. The rotor includes a flange that protrudes toward the sealing stator and occupies a space above the lip seal of the sealing stator and below the radial outer surface of the sealing stator. The sealing stator further includes an arm on the axial inward side of the assembly that extends radially towards the rotor. At the end of the arm, a face type lip protrudes axially towards the rotor and contacts the rotor to create a seal at one end of the labyrinth passage through the assembly. The arm can be biased axially towards the rotor such that the face type lip creates a tight seal. The assembly of this embodiment can optionally include features from previously described assemblies, such as the recess in the sealing surface interface portion of the lip seal and the protrusion and mating nodule.

These and other aspects of the present system and method will be apparent after consideration of the Detailed Description and Figures herein. It is to be understood, however, that the scope of the invention shall be determined by the claims as issued and not by whether given subject matter addresses any, or all issues noted in the Background or includes any features or aspects recited in this Summary.

DRAWINGS

Non-limiting and non-exhaustive embodiments of the present invention, including the preferred embodiment, are described with reference to the following figures, wherein like reference numerals refer to like parts throughout the various views unless otherwise specified.

DETAILED DESCRIPTION

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense.

Figure 1:
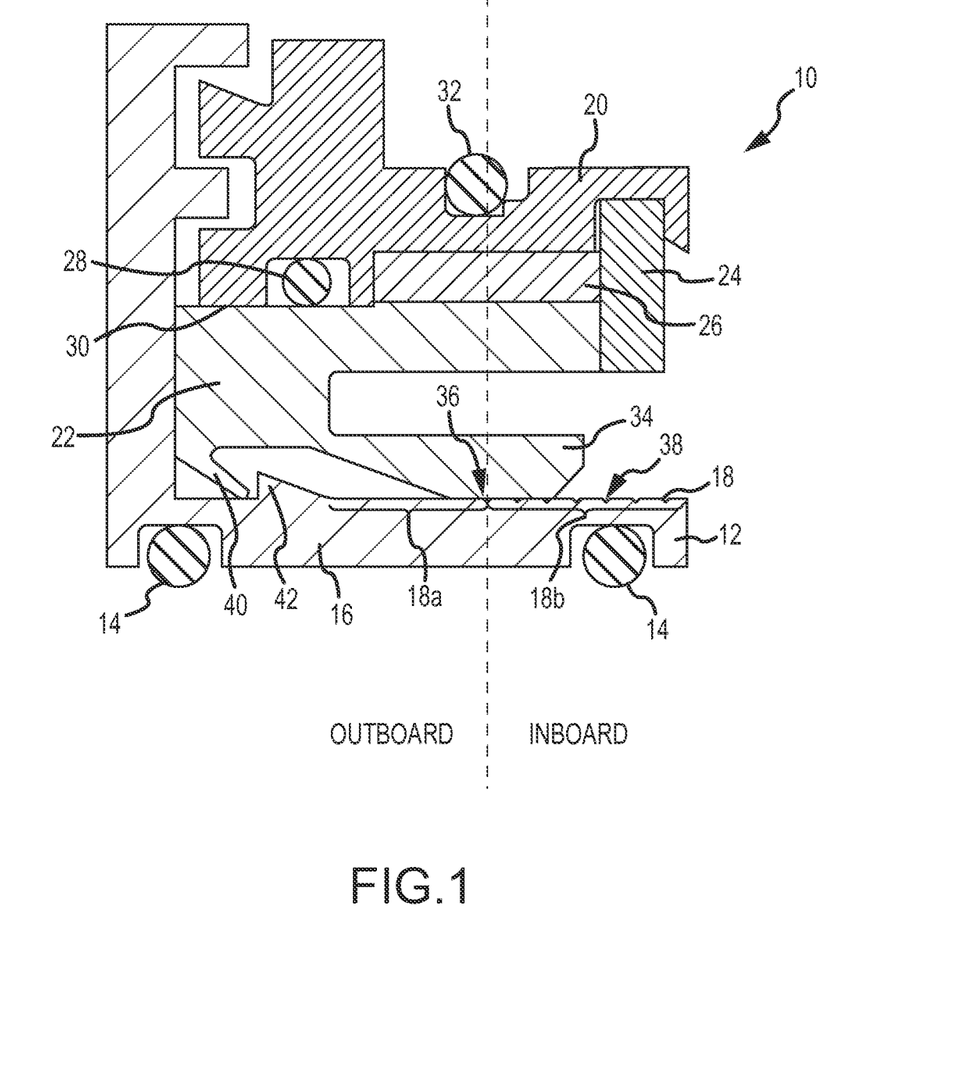
FIG. 1 depicts a partial, cut-away view of one embodiment of a flooded seal assembly.

With reference to FIG. 1, a labyrinth sealing device 10 is provided, in various embodiments, to provide a dynamic seal between a rotating shaft and a bearing housing. Accordingly, embodiments of the sealing device 10 will serve to prevent the leakage of lubricant from the bearing housing and the entry of contaminates into the housing. The sealing device 10 will generally include a rotor 12 that is placed in sealing engagement with the shaft (not depicted) by one or more o-rings 14. It is contemplated that the rotor will be formed from stainless steel, bronze or other material that is suitable for use with the intended purpose of the overall assembly in which the sealing device 10 is used. Likewise, the o-rings 14 may be provided in various materials commonly used in similar applications. In various embodiments, the rotor 12 will include an annular flange 16, which provides a running surface 18. As will be discussed in greater detail below, the running surface 18 of the annular flange 16 may be provided with a relatively smooth or modeled surface, or a combination thereof, to provide one or more desired attributes to the sealing device 10.

The sealing device 10 will further include a stator 20, which may be formed from bronze or other material known to be suitable for similar labyrinth sealing devices. In various embodiments, the stator 20 is coupled with a sealing element 22. In some embodiments, the stator 20 and sealing element 22 will be coupled with one another with a snap ring 24 that is press-fit adjacent an anti-rotation pin 26. It is contemplated that the snap ring 24 and anti-rotation pin 26 could be formed from steel or other similar material capable of coupling the stator 20 and sealing element 22 with one another throughout contemplated uses and the forces generated during such uses. Adjacent the anti-rotation pin 26, the stator 20 and sealing element 22 may be positioned to mate together with an o-ring 28 that is press-fit to create a static seal area 30. On its opposite surface, the stator 20 will be placed in sealing engagement with the bearing housing with an o-ring 32. The o-rings 28 and 32 may be provided in a similar construction and of similar materials to the o-ring 14. However, it is contemplated that various intended uses of the seal device 10 may require the use of additional or fewer o-rings or o-rings of different construction.

Figure 2:
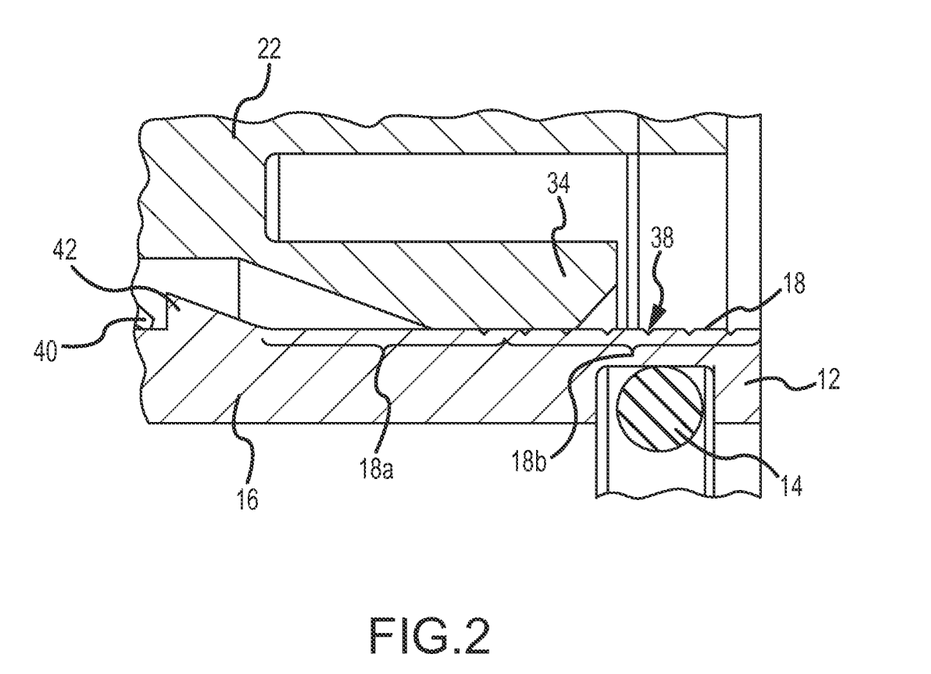
FIG. 2 depicts a partial, cut-away view of one embodiment of a sealing contact portion of the flooded seal assembly depicted in FIG. 1.

With reference to FIG. 2, some embodiments of the sealing device 10 will be provided with a lip seal 34 that extends inwardly from an axially outward position on the sealing element 22. The lip seal 34 may, in some embodiments, be provided with a unitizing feature as well as a flat sealing surface interface portion 36. In such embodiments, at least a portion of the sealing surface interface portion 36 rides against the flat portion of the rotor surface 18a. In some embodiments, the lip seal 34 will be biased radially inwardly to some degree to apply at least some pressure, for sealing engagement, when the lip seal 34 is placed against the rotor surface 18. It is contemplated that the seal element 22 may be formed from PTFE or other similar materials in order to provide the desired sealing characteristics as well as a resiliently deformable nature that may be desirable in the construction and use of labyrinth seal devices. The remaining or distal end portion of the sealing surface interface 36 is suspended over a helical pumping feature 38 on the rotor surface 18b when the lip seal is placed in its use position against the rotor surface 18.

In various embodiments, the helical pumping feature 38 may be provided by forming a generally helically shaped groove around the rotor surface 18b. It is contemplated that the groove may be formed through various molding or casting techniques as well as grinding or removing portions of the rotor surface 18b using known tooling equipment designed for such purposes. With the lip seal 34 riding on the rotor surface, the helical feature will continuously pull lubricant away from the sealing element 22 but allow the seal element 22 to seal lubricant in while the seal device 10 is static. If axial motion occurs, the lip seal 34 will remain in its critical location on the rotor, due to the unitizing feature, and continue to seal. Accordingly, it is contemplated that different groove patterns and configurations that are more or less helical, or assume different patterns, including sine waves, circular elements and other geometric shapes may be selected for their ability to draw fluid material away from a given area as the structure rotates.

Some embodiments of the sealing element 22 include a protrusion 40 that extends from the sealing element 22 on a side opposite the lip seal 34. The protrusion 40 may be provided with an angled, barb-shape, such as depicted in FIG. 1. In this manner, the protrusion 40 may be press fit past a mating nodule 42 that extends outwardly from the rotor surface 18, with angled surfaces of the opposing structures sliding past one another. The shapes of the protrusion 40 and mating nodule may be provided with flattened or reverse angle surfaces to engage one another and prevent the unintentional removal of the sealing element 22 from the rotor 18. In this manner, metal-to-metal contact of the rotor 12 and stator 20 may be significantly limited.

It will become apparent, after a review of the design of the seal device 10, that a number of prior art failings have been successfully addressed. In particular, the o-ring design of other devices, which do not hold their resiliency during any period of shaft to bore misalignment, is resolved with the present design. The seal device 10 prevents the seal from separating from the rotor. Moreover, the design of the seal device 10 prevents the seal element 22 from separating from the rotor 18, as is experienced frequently in the prior art. These benefits are accomplished, at least in part, by fixing the seal element 22 to the stationary portions of the seal device 10 by means of the flange 16, and allowing the lip seal 34 to float in the radial direction.

Figure 3A:
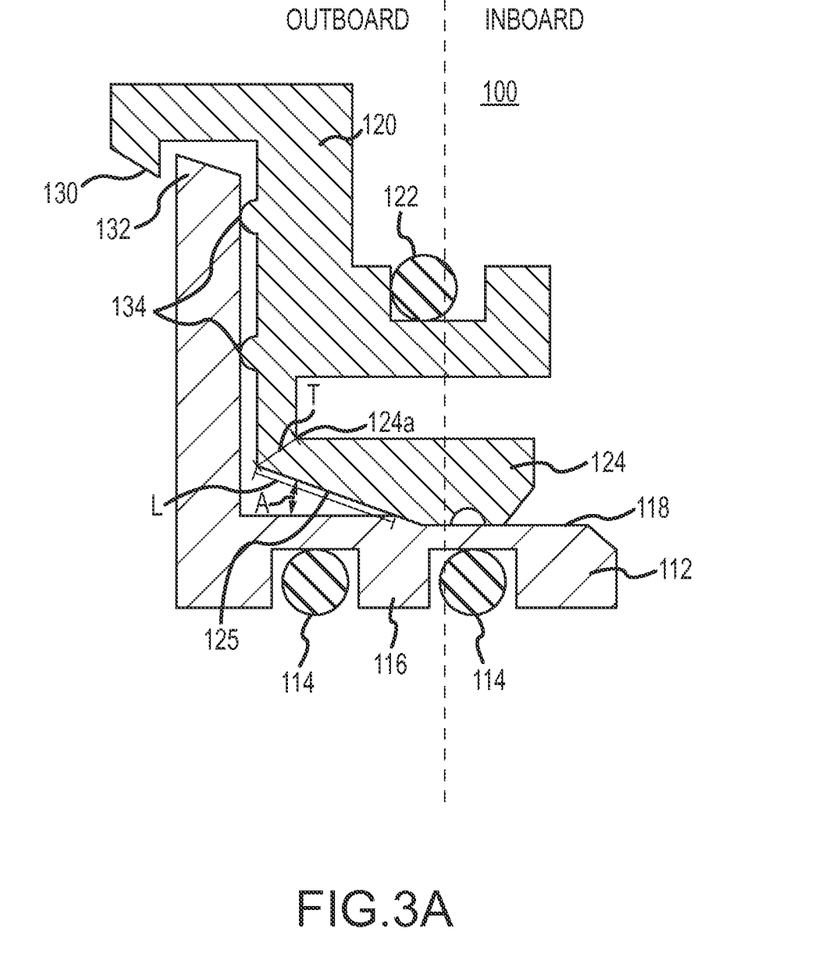
FIG. 3A depicts a partial, cut-away view of another embodiment of a flooded seal assembly.
Figure 3B:
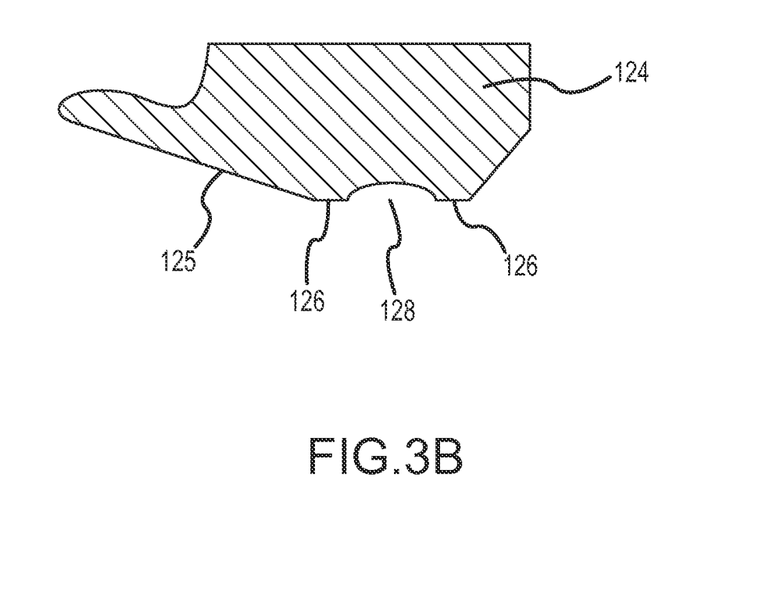
FIG. 3B depicts a partial, cut-away view of one embodiment of a sealing contact portion of the flooded seal assembly depicted in FIG. 3A.

With reference to FIGS. 3A and 3B, a labyrinth sealing device 100 is provided as one alternate embodiment to sealing device 10. Various embodiments of the sealing device 100 may be employed to provide a dynamic seal between a rotating shaft and a bearing housing. The sealing device 100 includes a rotor 112 that is placed in sealing engagement with the shaft (not depicted) by one or more o-rings 114. The rotor 112 may be formed from stainless steel, bronze or other material that is suitable for use with the intended purpose of the overall assembly in which the sealing device 100 is used. Similarly, the o-rings 114 may be provided in various materials commonly used in such applications. In various embodiments, the rotor 112 will include an annular flange 116, which provides a running surface 118.

Embodiments of the sealing device 100 will further include a stator and a sealing element. In some embodiments, the stator and sealing element may be formed in unitary construction to provide a sealing stator 120 which may be formed from PTFE, teflon or other material known to be suitable for similar labyrinth sealing devices. In various embodiments, the material that is used to form the sealing stator 120 will provide low-friction, low-wear, and sealing characteristics desired for the particular uses intended. On its radially outwardly faced surface, the sealing stator 120 will be placed in sealing engagement with the bearing housing with an o-ring 122, which may be provided in a similar construction and of similar materials to the o-ring 114. However, it is contemplated that various intended uses of the sealing device 100 may require the use of additional or fewer o-rings or o-rings of different construction.

With further reference to FIGS. 3A and 3B, some embodiments of the sealing stator 120 will include a lip seal 124 that extends in an axially inward direction. The lip seal 124 may, in some embodiments, be provided with a unitizing feature as well as a flat sealing surface interface portion 126. In such embodiments, at least a portion of the sealing surface interface portion 126 rides against the flat portion of the running surface 118. In some embodiments, the lip seal 124 will be biased inwardly to some degree to apply at least some pressure, for sealing engagement, when the lip seal 124 is placed against the running surface 118, which may be provided in a smooth or ground running surface 118. When the lip seal 124 is biased, the lip seal includes a hinge point 124a. The hinge point can have a thickness T shown in FIG. 3A. Any suitable thickness T can be used. In some embodiments, the thickness can range from 0.010 to 0.150.

As seen in FIG. 3A, a portion of the radial inner surface of the lip seal 124 is angled. This angled surface 125 extends from the sealing surface interface portion 126 up away from the running surface 118. An angle A is formed at the contact point between the angled surface 125 and the running surface 118. Any suitable angle A can be used. In some embodiments, the angle A can range from 10° to 45°. Adjustments to the angle A and thickness T can alter the length L between the hinge point 124a and the first contact point between the sealing surface interface portion 126 and the running surface 118.

Figure 3C:
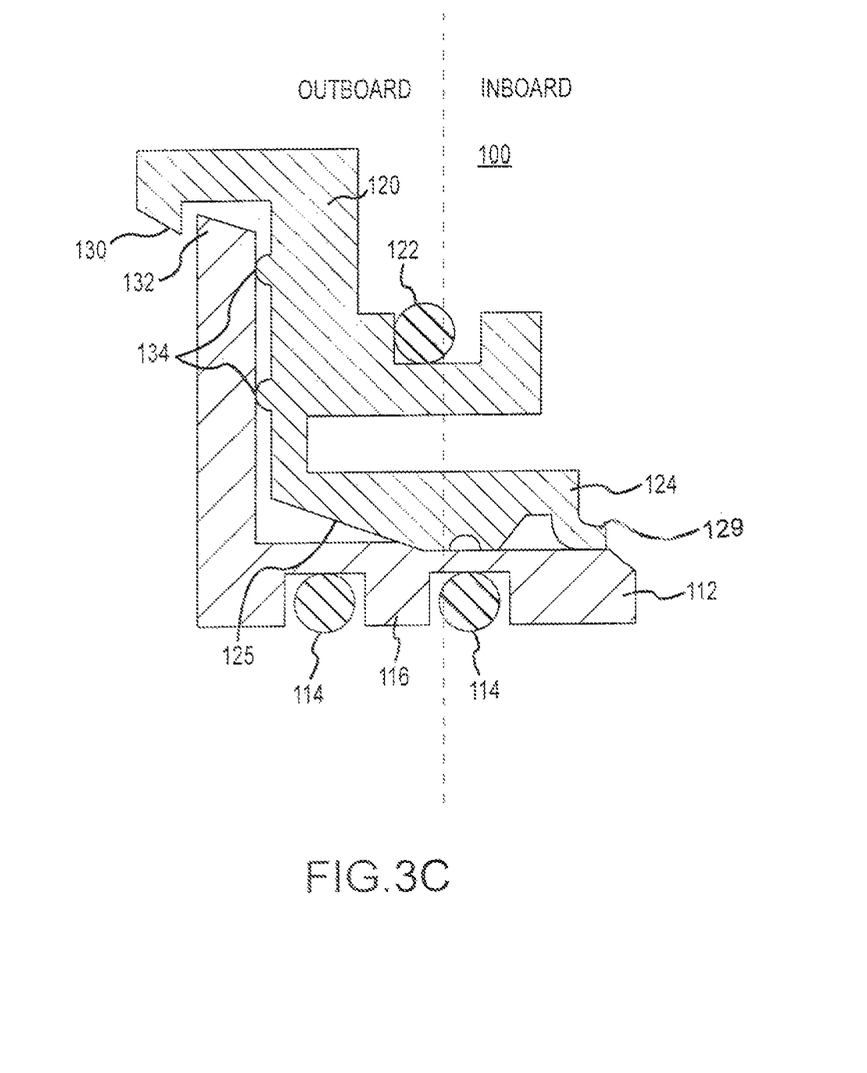
FIG. 3C depicts a partial, cut-away view of another embodiment of a flooded seal assembly.

In some embodiments, a radially-oriented protrusion 129 may be included at the end of the lip seal 124 to create an additional seal between the rotor 112 and the sealing stator 120. As shown in FIG. 3C, the radially-oriented protrusion 129 is deflected by the running surface 118 of the rotor 112 when the rotor 112 is mated with the sealing stator 120. The radially-oriented protrusion 129 can be biased in an axially outward direction to better effect the seal between the rotor 112 and the sealing stator 120. As also seen in FIG. 3C, a gap may exist between the end of the sealing surface interface portion 126 and the radially-oriented protrusion 129. The length of the sealing stator interface portion 118 can be altered to accommodate for the inclusion of the radially-oriented protrusion 129.

In various embodiments, the sealing surface interface portion 126 will include one or more recesses 128. In some embodiments, the one or more recesses 128 may be positioned intermediate opposite ends of the sealing surface interface portion 126, while in other embodiments, the one or more recesses 128 may be positioned closer or immediately adjacent one or the opposite ends of the sealing surface interface portion 126. In any such embodiment, the one or more recesses 128 creates a pressure differential that allows the sealing surface interface portion 126 to ride on the running surface 118 without experiencing undue wear or allowing the passage of fluids or debris to pass the lip seal 124. The length of the sealing surface interface portion 118 can be increased to accommodate additional recesses 128.

Some embodiments of the sealing stator 120 include a protrusion 130 that extends from an axially outwardly positioned flange, although this protrusion 130 is not required for sealing performance. The protrusion 130 may be provided with an angled, barb-shape, such as depicted in FIG. 3A. In this manner, the protrusion 130 may be press fit past a mating nodule 132 that extends outwardly from an outer edge of the rotor 112, with angled surfaces of the opposing structures sliding past one another. The shapes of the protrusion 130 and mating nodule 132 may be provided with flattened or reverse angle surfaces to engage one another and prevent the unintentional removal of the sealing stator 120 from the rotor 112. The gap between the mating nodule 132 and the protrusion 130 can be varied to allow for more or less axial movement of the rotor 112. Once the rotor 112 and sealing stator 120 are placed in a position where the protrusion 130 and mating nodule 132 engage one another, one or more ridges or wear beads 134 may be positioned along a lower surface of the sealing stator 120 to engage the rotor 112. Conversely, or in combination with, the ridges or wear beads 134 can also protrude from the surface of the rotor 112 and engage the sealing stator 120. In such embodiments, minimal frictional engagement is attained between the rotor 112 and the sealing stator 120.

Figure 4:
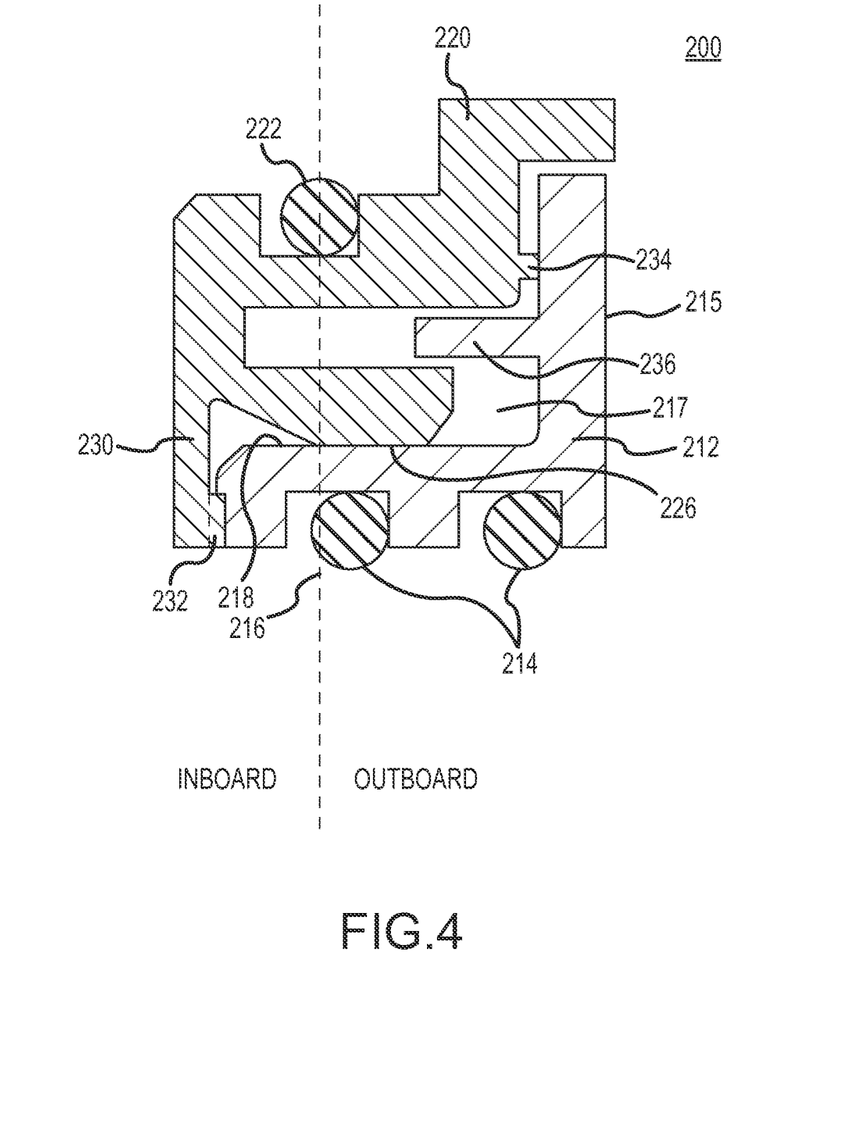
FIG. 4 depicts a partial, cut-away view of another embodiment of a flooded seal assembly.

With reference to FIG. 4, a labyrinth sealing device 200 is provided as another alternate embodiment to sealing device 10. Various embodiments of the sealing device 200 may be employed to provide a dynamic seal between a rotating shaft and a bearing housing. The, sealing device 200 includes a rotor 212 that is placed in sealing engagement with the shaft (not depicted) by one or more o-rings 214. The rotor 212 may be formed from stainless steel, bronze or other material that is suitable for use with the intended purpose of the overall assembly in which the sealing device 200 is used. Similarly, the o-rings 214 may be provided in various materials commonly used in such applications. In various embodiments, the rotor 212 will include an annular flange 216 that is aligned in an axial direction, which provides a running surface 218. The rotor 212 can also include a radial portion 215, which is sometimes referred to as a radially-oriented base portion 215, that helps form an enclosed space between the rotor 212 and the sealing stator 220 described in greater detail below.

Embodiments of the sealing device 200 will further include a sealing stator 220 which may be formed from PTFE, teflon or other material known to be suitable for similar labyrinth sealing devices. In various embodiments, the material that is used to form the sealing stator 220 will provide low-friction, low-wear, and sealing characteristics desired for the particular uses intended. On its radially outwardly faced surface, the sealing stator 220 will be placed in sealing engagement with the bearing housing with an o-ring 222, which may be provided in a similar construction and of similar materials to the o-ring 214. However, it is contemplated that various intended uses of the sealing device 200 may require the use of additional or fewer o-rings or o-rings of different construction. As can be seen in FIG. 4, when the sealing stator 220 and the rotor 212 are brought together, a labyrinth passage 217 is formed. The labyrinth passage includes turns and bends that cause turbulence within the labyrinth passage 217 and thereby makes the passage of lubricant or contaminants through the labyrinth passage 217 more difficult.

Some embodiments of the sealing device 200 illustrated in FIG. 4 will include a lip seal 224 that extends axially outwardly from the sealing stator 220 and towards the rotor 212. The lip seal 224 may, in some embodiments, be provided with a unitizing feature as well as a flat sealing surface interface portion 226. As shown in FIG. 4, the entirety of the sealing surface interface portion 226 rides against the running surface 218. In some embodiments, the lip seal 224 will be biased radially inwardly towards the rotor 212 to some degree to apply at least some pressure, for sealing engagement, when the lip seal 224 is placed against the running surface 218.

In some embodiments, the sealing stator 220 includes an arm 230 that extends radially towards the rotor 212. The arm 230 can extend in a radial direction towards the rotor 212 until at least a portion of the arm 230 overlaps with the annular flange 216 of the rotor 212. In some embodiments, the end of the arm 230 is substantially even with the radially inner surface of the annular flange 216. The end of the arm 230 includes a face type lip 232 that protrudes away from the arm 230 in an axially outward direction (i.e., towards the annular flange 216 of the rotor 212). The face type lip 232 contacts the annular flange 216 and creates a sealing that can prevent lubricant and/or contaminants from passing in or out of the labyrinth passage 217 formed between the sealing stator 220 and the rotor 212. The annular flange 216 seals at a lower pressure when lubricant is kept from passing into the labyrinth passage 217 at the annular flange 216, thus making the seal formed by the face type lip 232 beneficial.

The arm 230 can be biased in a axially outward direction in order to form a stronger seal between the face type lip 232 and the annular flange 216. The face type lip 232 preferably has a square shape such that the contacting surfaces of the annular flange 216 and the face type lip 232 are aligned in parallel, although other shapes can be used for the face type lip 232 including shapes that may form a point or line contact rather than a surface contact.

The pressure loading of the face type lip 232 against the annular flange 216 can be set at a predetermined value using a square ridge 234 that protrudes axially outward from the sealing stator 220 towards the rotor 212. As shown in FIG. 4, the square ridge 234 is located within the labyrinth passage 217 towards the radially outer surface of the sealing stator 220. When the sealing stator 220 is paired with the rotor 212, the square ridge 234 dictates how closely the sealing stator 220 and the rotor 212 come together. The length of the square ridge 234 ensures that the sealing stator 220 and the rotor are brought together closely enough to ensure the arm 230 is flexed against its bias and a firm interference seal is formed between the face type lip 232 and the annular flange 216. Additionally, the square ridge 234 ensures that the sealing stator 220 and the rotor 216 are not brought together so closely that the arm 230 overflexes against its bias and possibly causes the arm 230 to snap off of the sealing stator 220 (thereby forming no seal at all at the annular flange 216). Furthermore, the square ridge 232 further builds the labyrinth passage 217 and makes it more difficult for contaminants and/or lubricant to pass through the labyrinth passage 217.

The rotor 212 can further include a flange 236 that protrudes axially inwardly from the radial portion 215 of the rotor 212. The flange 236 is positioned on the radial portion 215 such that the flange 236 extends into a space formed between the lip seal 224 and the radially outer surface of the sealing stator 220. In this manner, the flange 236 results in a complex labyrinth passage 217. The flange 236 results in the formation of more turbulence within the labyrinth passage 217 while also increasing the pressure on the outboard side. Because the pressure on the outboard side is typically lower compared to the inboard side, this increase in pressure beneficially reduces the pressure between the outboard side and the inboard side.

Figure 5:
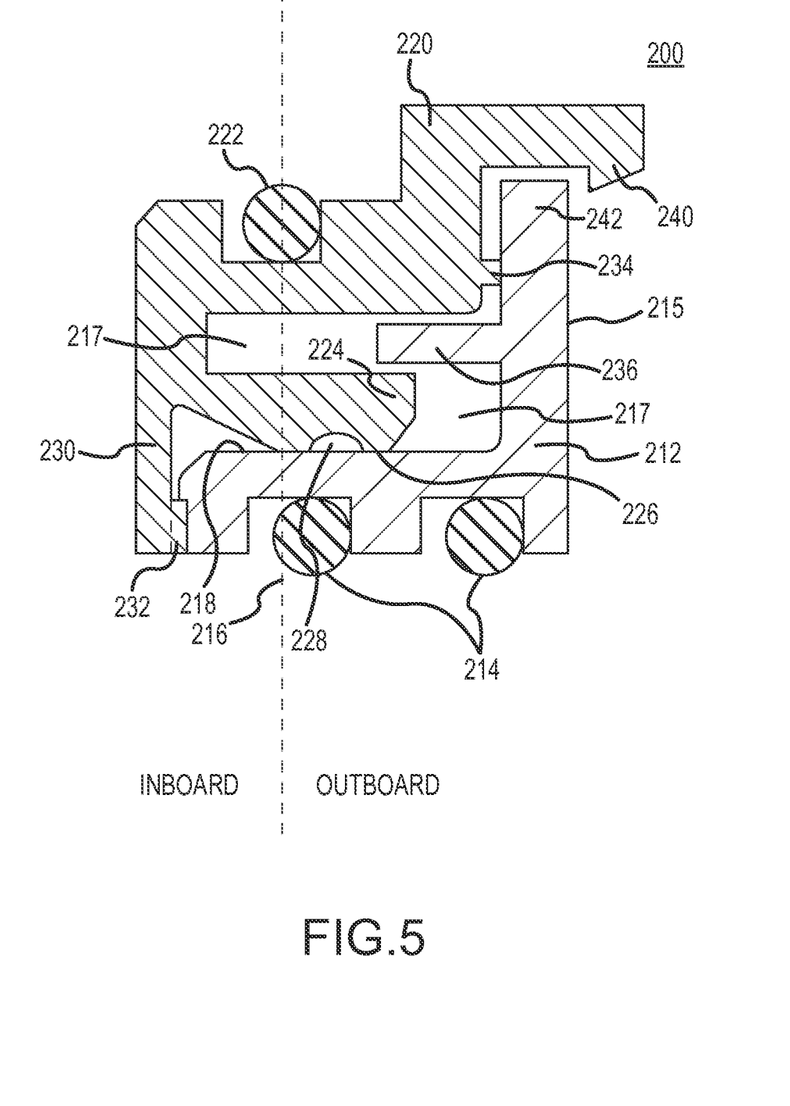
FIG. 5 depicts a partial, cut-away view of another embodiment of a flooded seal assembly.

As shown in FIG. 5, the labyrinth sealing device 200 can include one or more of the features included in the labyrinth sealing device 100 shown in FIGS. 3A and 3B. For example, the labyrinth sealing device 200 can include a lip seal 224 having a recess 228, and can also include a protrusion 240 and mating nodule 242 to ensure the sealing stator 220 and the rotor remain mated to one another. The combination of these features together with the face type lip 232, the square ridge 234, and the flange 236 can result in a labyrinth sealing device well suited for preventing the migration of lubricant and/or contaminants through the labyrinth passage 217.

Although the sealing devices 10, 100, and 200 have been described in language that is specific to certain structures, materials, and methodological steps, it is to be understood that the invention defined in the appended claims is not necessarily limited to the specific structures, materials, and/or steps described. Rather, the specific aspects and steps are described as forms of implementing the claimed invention. Since many embodiments of the invention can be practiced without departing from the spirit and scope of the invention, the invention resides in the claims hereinafter appended. Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques. Moreover, all ranges disclosed herein are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

We claim:

1. A labyrinth sealing device comprising:
   a rotor comprising:
     a radially-oriented base portion having a radial outer end and a radial inner end opposite the radial outer end;
     a first axially oriented flange located between the radial outer end and the radial inner end; and a second axially oriented flange located at the radial inner end, the second axially oriented flange having a radially outer surface and a radially inner surface opposite the radially outer surface, wherein the radially outer surface is a running surface;

wherein the first axially oriented flange and the second axially oriented flange extend in the same axial direction and wherein the first axially oriented flange is shorter than the second axially oriented flange; and a sealing stator comprising:
a lip seal extending axially outward and having a radially outer surface and a radially inner surface opposite the radially outer surface, wherein the radially inner surface is an interface surface that rides directly against the running surface; and
at least one ridge protruding from the sealing stator and contacting the radially-oriented base of the rotor,
wherein at least a portion of the lip seal extends under but does not contact the first flange.

2. The labyrinth sealing device as recited in claim 1, wherein the interface surface includes one or more recesses.

3. The labyrinth sealing device as recited in claim 1, wherein the sealing stator further comprises:
a radially-oriented arm protruding in a radially inward direction, wherein the radially-oriented arm protrudes in front of an axially inner end of the second axially oriented flange.

4. the labyrinth sealing device as recited claim 3 wherein the radially orientied arm includes a face type lip that contacts the axially inner end of the second axially oriented flange.

5. The labyrinth sealing device as recited in claim 4, wherein the radially-oriented arm is biased in an axially outward direction.

6. The labyrinth sealing device as recited in claim 1, wherein the at least one ridge comprises at least one square ridge.

7. The labyrinth sealing device as recited in claim 6, wherein the at least one ridge comprises a plurality of ridges.

8. The labyrinth sealing device as recited, in claim 1, wherein the running surface comprises a flat portion and a grooved portion.

9. The labyrinth sealing device as recited in claim 8, wherein the interface surface rides against both the fiat portion and the grooved portion of the running surface.

10. The labyrinth sealing device as recited in claim 8, wherein the grooved portion is a helically grooved portion.

11. The labyrinth sealing device as recited in claim 8, wherein the fiat portion of the running surface is on the axially outer side and the grooved portion of the running surface is on the axially inner side.

12. A labyrinth sealing device comprising:
a rotor comprising:
a radially-oriented base portion having a radial outer end and a radial inner end opposite the radial outer end;
a first axially oriented flange located between the radial outer end and the radial inner end; and
a second axially oriented flange located at the radial inner end, the second axially oriented flange having a radially outer surface and a radially inner surface opposite the radially outer surface, wherein the radially outer surface is a running surface;
wherein the first axially oriented flange and the second axially oriented flange extend in the same axial direction and wherein the first axially oriented flange is shorter than the second axially oriented flange; and a sealing stator comprising:
a lip seal extending axially outward and having a radially outer surface and a radially inner surface opposite the radially outer surface, wherein the radially inner surface is an interface surface that rides directly against the running surface; and
a radially-oriented arm protruding in a radially inward direction, wherein the radially-oriented arm protrudes in front of an axially inner end of the second axially oriented flange;
wherein at least a portion of the lip seal extends under but does not contact the first flange.

13. The labyrinth sealing device as recited in claim 12, wherein the radially oriented arm includes a face type lip that contacts the axially inner end of the second axially oriented flange.

14. The labyrinth sealing device as recited in claim 13, wherein the radially-oriented arm is biased in an axially outward direction.

15. A labyrinth sealing device comprising:
a rotor comprising:
a radially-oriented base portion having a radial outer end and a radial inner end opposite the radial outer end;
a first axially oriented flange located between the radial outer end and the radial inner end; and
a second axially oriented flange located at the radial inner end, the second axially oriented flange having a radially outer surface and a radially inner surface opposite the radially outer surface, wherein the radially outer surface is a running surface;
wherein the first axially oriented flange and the second axially oriented flange extend in the same axial direction and wherein the first axially oriented flange is shorter than the second axially oriented flange; and a sealing stator comprising:
a lip seal extending axially outward and having a radially outer surface and a radially inner surface opposite the radially outer surface, wherein the radially inner surface is an interface surface and the entirety of the radially inner surface rides against the running surface; and
at least one ridge protruding from the sealing stator and contacting the radially-oriented base of the rotor,
wherein at least a portion of the lip seal extends under but does not contact the first flange.

16. A labyrinth sealing device comprising:
a rotor comprising:
a radially-oriented base portion having a radial outer end and a radial inner end opposite the radial outer end;
a first axially oriented flange located between the radial outer end and the radial inner end; and
a second axially oriented flange located at the radial inner end, the second axially oriented flange having a radially outer surface and a radially inner surface opposite the radially outer surface, wherein the radially outer surface is a running surface;
wherein the first axially oriented flange and the second axially oriented flange extend in the same axial direction and wherein the first axially oriented flange is shorter than the second axially oriented flange; and a sealing stator comprising:
a lip seal extending axially outward and having a radially outer surface and a radially inner surface opposite the radially outer surface, wherein the radially inner surface is an interface surface and the entirety of the radially inner surface rides against the running surface; and a radially-oriented arm protruding in a radially inward direction, wherein the radially-oriented arm protrudes in front of an axially inner end of the second axially oriented flange;

wherein at least a portion of the lip seal extends under but does not contact the first flange.

* * * * *

UNITED STATES PATENT AND TRADEMARK OFFICE
CERTIFICATE OF CORRECTION

PATENT NO.        : 8,820,749 B2
APPLICATION NO.   : 12/944456
DATED             : September 2, 2014
INVENTOR(S)       : Tones et al.

Page 1 of 1

It is certified that error appears in the above-identified patent and that said Letters Patent is hereby corrected as shown below:

In the Claims,

In column 9, line 29, in claim 4, delete "the" and insert -- The --, therefor.

In column 9, line 45, in claim 9, delete "fiat" and insert -- flat --, therefor.

In column 9, line 50, in claim 11, delete "fiat" and insert -- flat --, therefor.

Signed and Sealed this
Eighteenth Day of November, 2014

Michelle K. Lee
*Deputy Director of the United States Patent and Trademark Office*